(12) United States Patent  
Inui

(10) Patent No.: US 8,897,961 B2  
(45) Date of Patent: Nov. 25, 2014

(54) METHOD FOR DETERMINING INSTALLATION POSITION OF PORTABLE INFORMATION TERMINAL ON VEHICLE

(71) Applicant: Honda Motor Co., Ltd., Tokyo (JP)

(72) Inventor: Shujiro Inui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 13/848,732

(22) Filed: Mar. 22, 2013

(65) Prior Publication Data

US 2013/0261892 A1    Oct. 3, 2013

(30) Foreign Application Priority Data

Mar. 28, 2012    (JP) .................. 2012-072746

(51) Int. Cl.
*B60R 11/02* (2006.01)
*B60R 11/04* (2006.01)
*G06K 9/00* (2006.01)
*G01C 21/26* (2006.01)

(52) U.S. Cl.
CPC .......... *G06K 9/00832* (2013.01); *G01C 21/265* (2013.01)
USPC ........................................................ 701/36

(58) Field of Classification Search
None
See application file for complete search history.

(56) References Cited

U.S. PATENT DOCUMENTS

2010/0231717 A1*  9/2010  Sasaki et al. ................. 348/148
2012/0314073 A1* 12/2012  Shimoda et al. ............. 348/148

FOREIGN PATENT DOCUMENTS

| DE | 102009033186 | | 2/2011 |
| JP | 63-133002 | | 6/1988 |
| JP | 2005-16979 | * | 1/2005 |
| JP | 4827994 B1 | * | 11/2011 |

* cited by examiner

*Primary Examiner* — Michael J Zanelli
(74) *Attorney, Agent, or Firm* — Mori & Ward, LLP

(57) ABSTRACT

In a method for determining an installation position of a portable information terminal on a vehicle, a present camera image showing a camera image at a present position of the camera of the portable information terminal installed on the vehicle is acquired. It is determined, based on a position of a predetermined vehicle component of the vehicle in the present camera image, whether or not the portable information terminal is installed at a predetermined installation position on the vehicle. It is notified from the portable information terminal that the portable information terminal is not installed at the predetermined installation position if it is determined that the portable information terminal is not installed at the predetermined installation position.

20 Claims, 13 Drawing Sheets

METHOD FOR DETERMINING INSTALLATION POSITION OF PORTABLE INFORMATION TERMINAL ON VEHICLE

CROSS-REFERENCE TO RELATED APPLICATIONS

The present application claims priority under 35 U.S.C. §119 to Japanese Patent Application No. 2012-072746, filed Mar. 28, 2012. The contents of this application are incorporated herein by reference in their entirety.

BACKGROUND OF THE INVENTION

1. Field of the Invention

The present invention relates to a method for determining an installation position of a portable information terminal on a vehicle.

2. Discussion of the Background

Conventionally, a technique in which the portable information terminal is fixed in a portable information terminal supporting unit such as a portable information terminal case or holder provided in advance on a vehicle and thus the fixed portable information terminal is utilized as an indicator like a meter or as a bidirectional communication interface is disclosed, as described in German Laid-Open Patent Application No. 10 2009 033 186, Specification (FIGS. 1, 6).

Meanwhile, these days, a service is known in which a portable information terminal and a navigation information center are linked (connected) via communication and then route guide (navigation) is given on a display device of the portable information terminal, utilizing a position detection function such as a GPS function of the portable information terminal.

If such a portable information terminal is installed on a vehicle, for example, a motorcycle, the map on the display device of the portable information terminal follows changes in the present position of the vehicle and therefore a route guide service (navigation service) to assist the driver can be provided. Particularly when a system configuration in which a navigation information center acquires traveling information from plural vehicles and uses the information to navigate other vehicles is employed, a route that avoids congested roads can be shown quickly, which is very convenient.

As a technique related to this technique, JP-A-63-133002 discloses a device which uses a camera to accurately measure the position and attitude of an object in a three-dimensional space the origin of which is the lens center of the camera.

SUMMARY OF THE INVENTION

According to one aspect of the present invention, in a method for determining an installation position of a portable information terminal on a vehicle, a present camera image showing a camera image at a present position of the camera of the portable information terminal installed on the vehicle is acquired. It is determined, based on a position of a predetermined vehicle component of the vehicle in the present camera image, whether or not the portable information terminal is installed at a predetermined installation position on the vehicle. It is notified from the portable information terminal that the portable information terminal is not installed at the predetermined installation position if it is determined that the portable information terminal is not installed at the predetermined installation position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
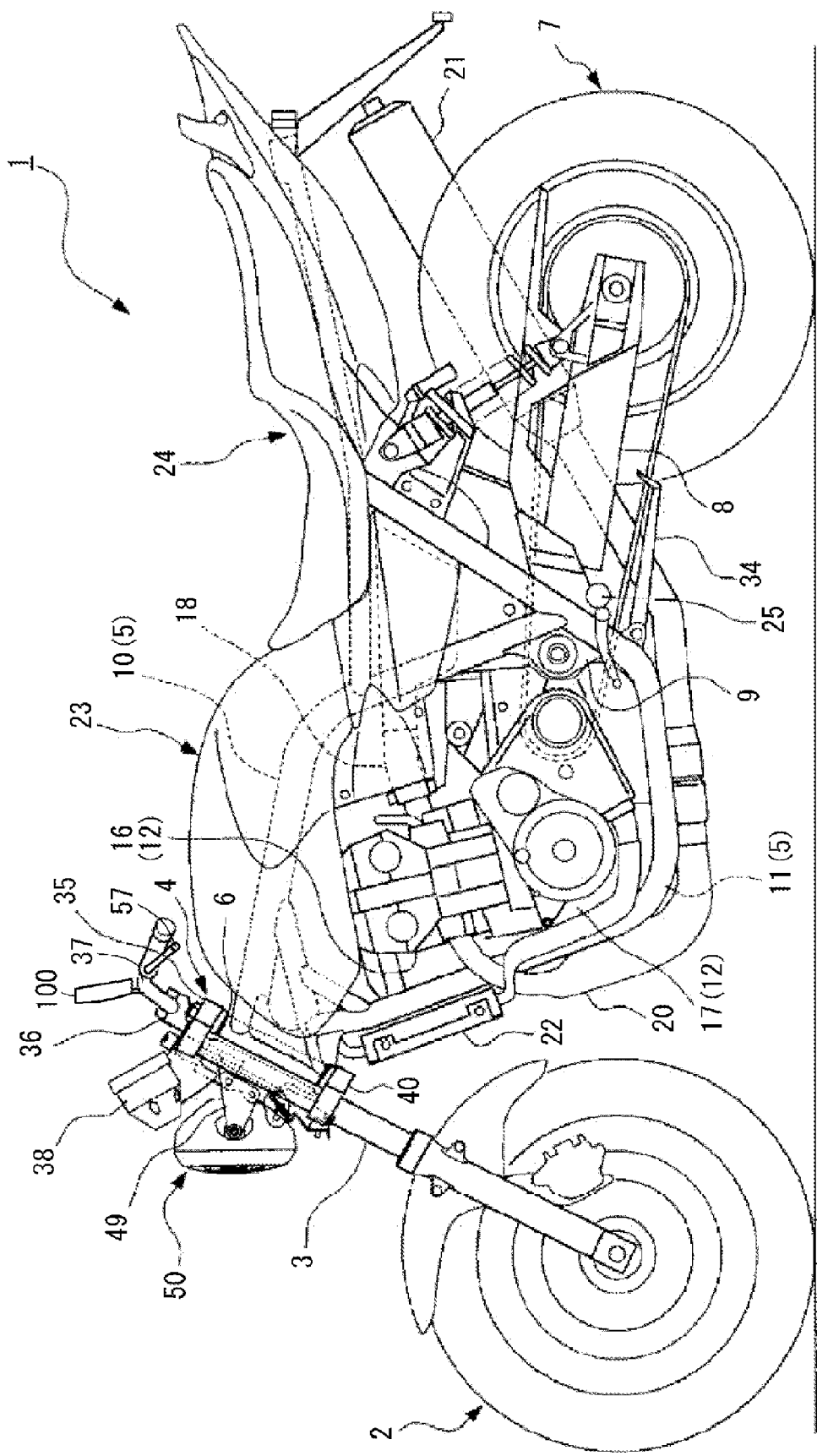
FIG. 1 is a side view of a motorcycle as a vehicle on which a method for installing a portable information terminal on a vehicle according to an embodiment is carried out.

The embodiments will now be described with reference to the accompanying drawings, wherein like reference numerals designate corresponding or identical elements throughout the various drawings.

Figure 2:
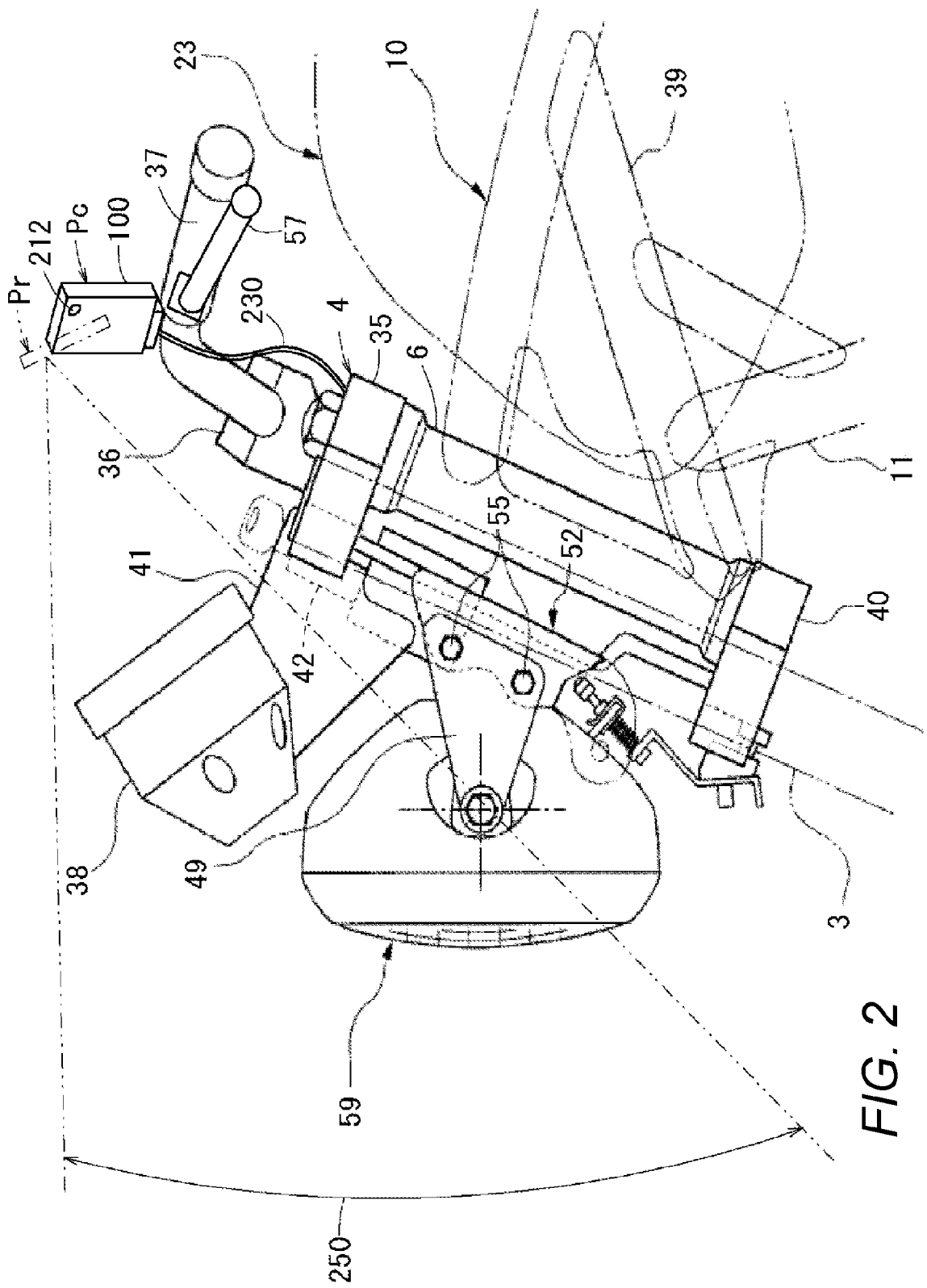
FIG. 2 is an enlarged side view of the peripheries of a head pipe of the vehicle.
Figure 3:
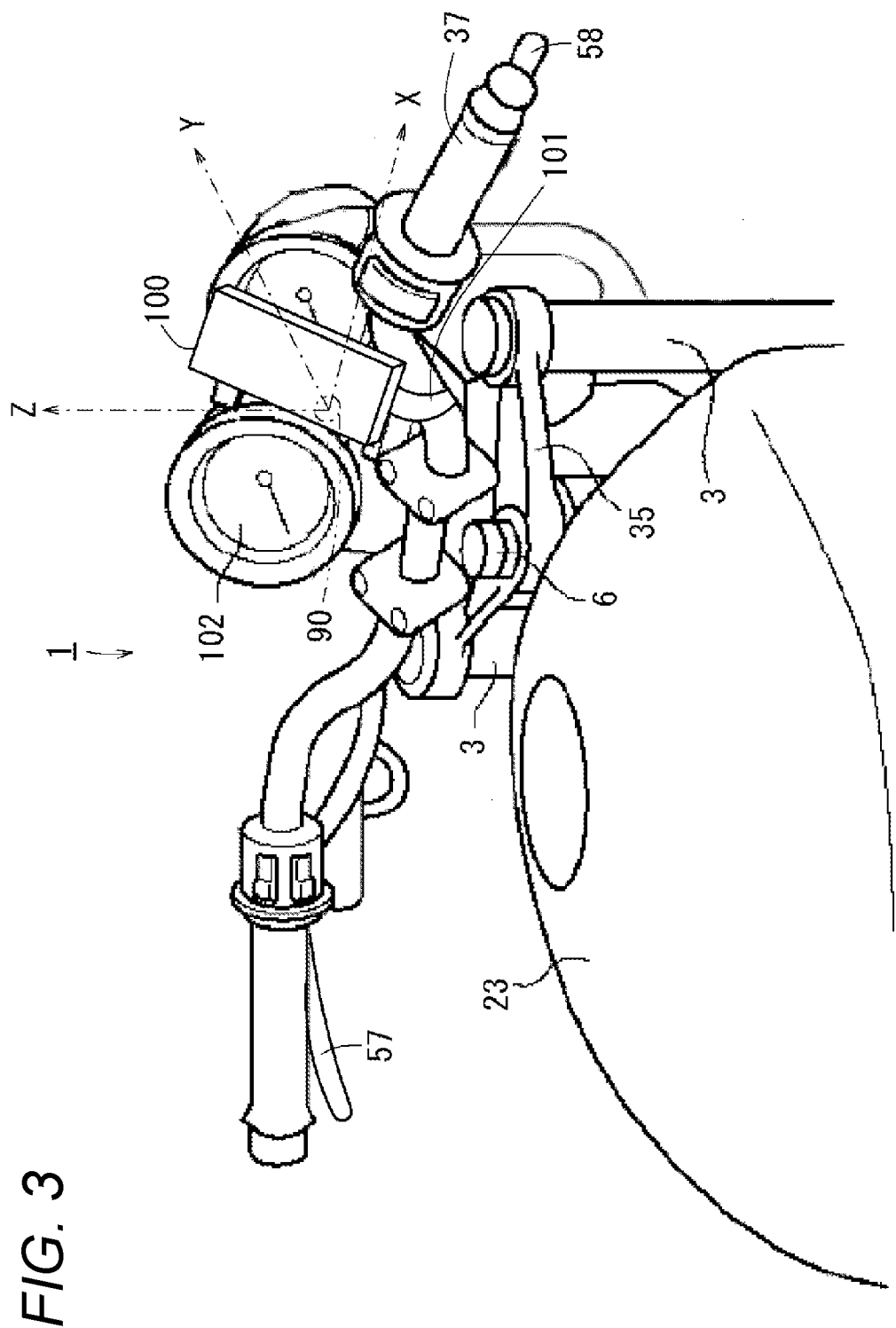
FIG. 3 is a schematic perspective view showing a vehicle front part of the vehicle with a portable information terminal installed thereon, in an enlarged view.
Figure 4:
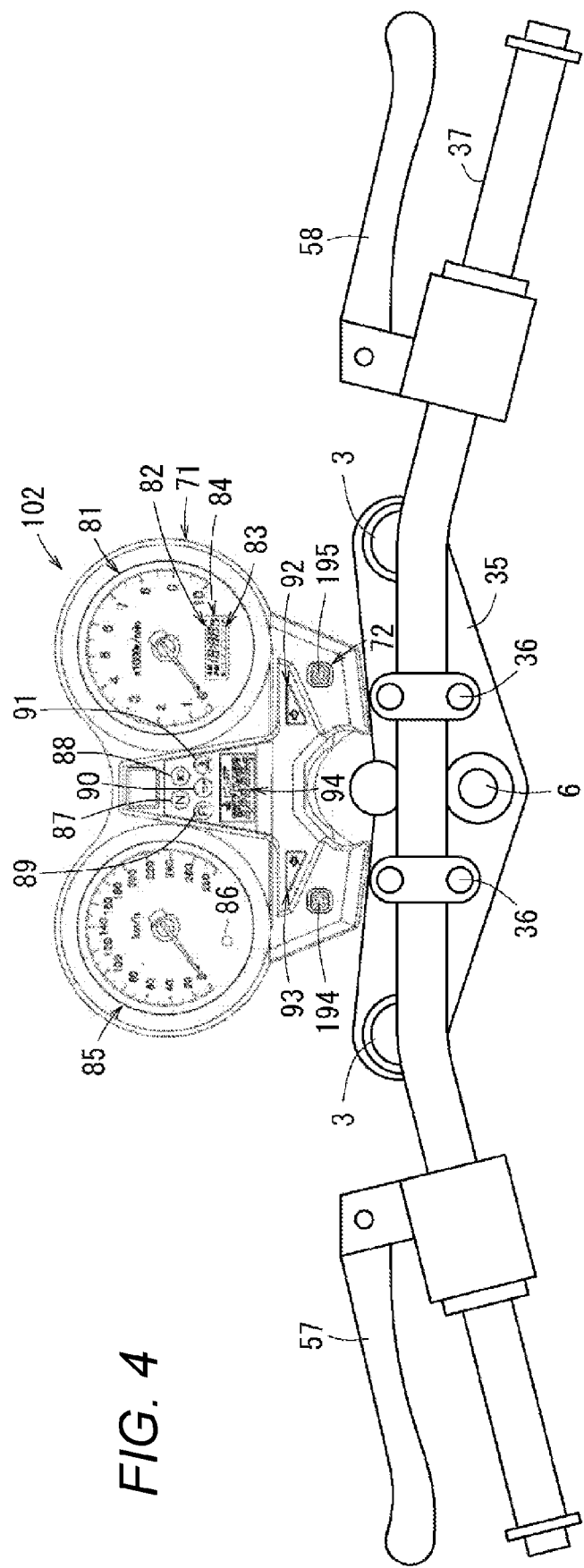
FIG. 4 is a schematic plan view for explaining a vehicle display unit.
Figure 5:
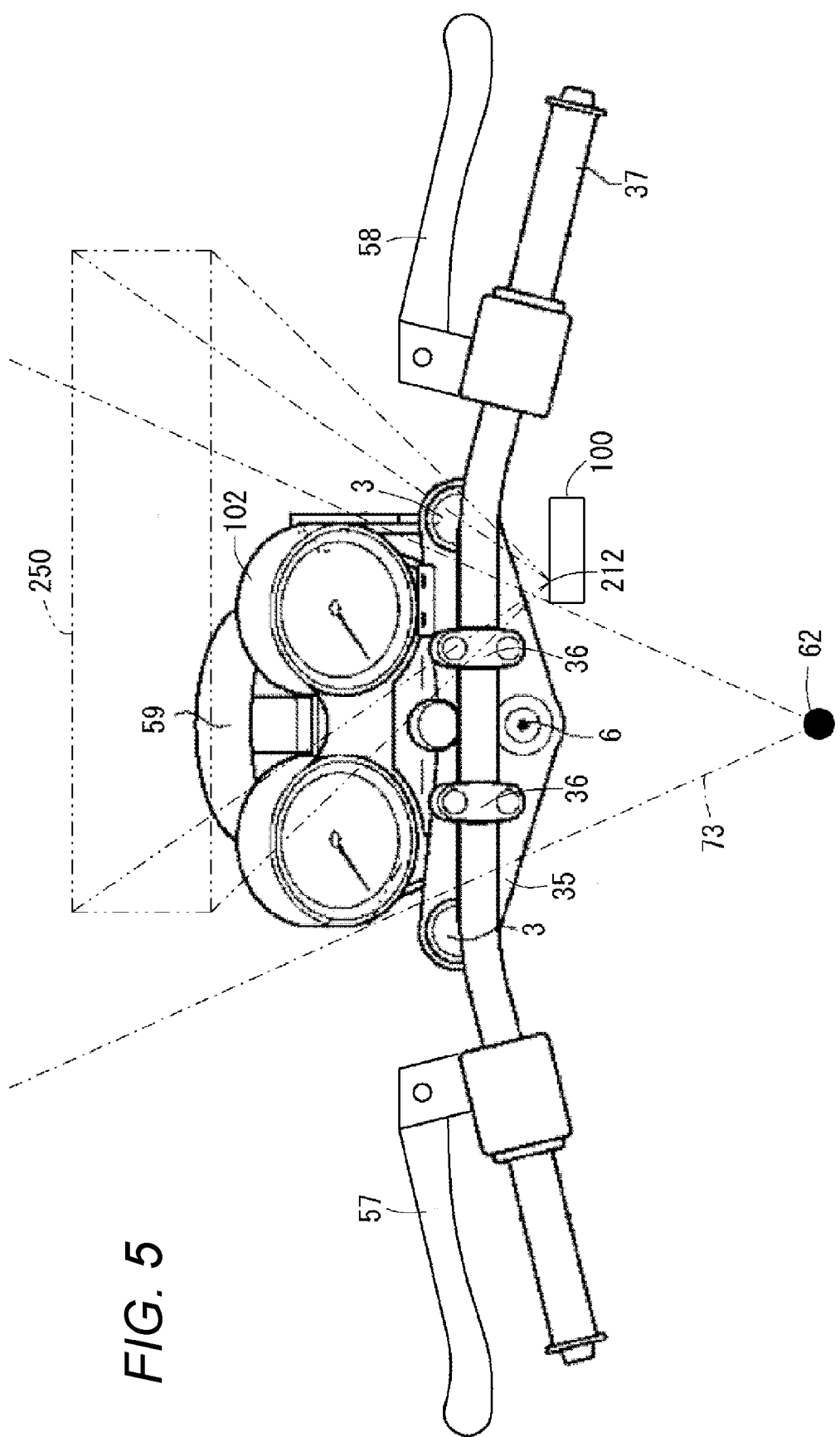
FIG. 5 is a schematic plan view of the vehicle with the portable information terminal installed thereon.
Figure 6:
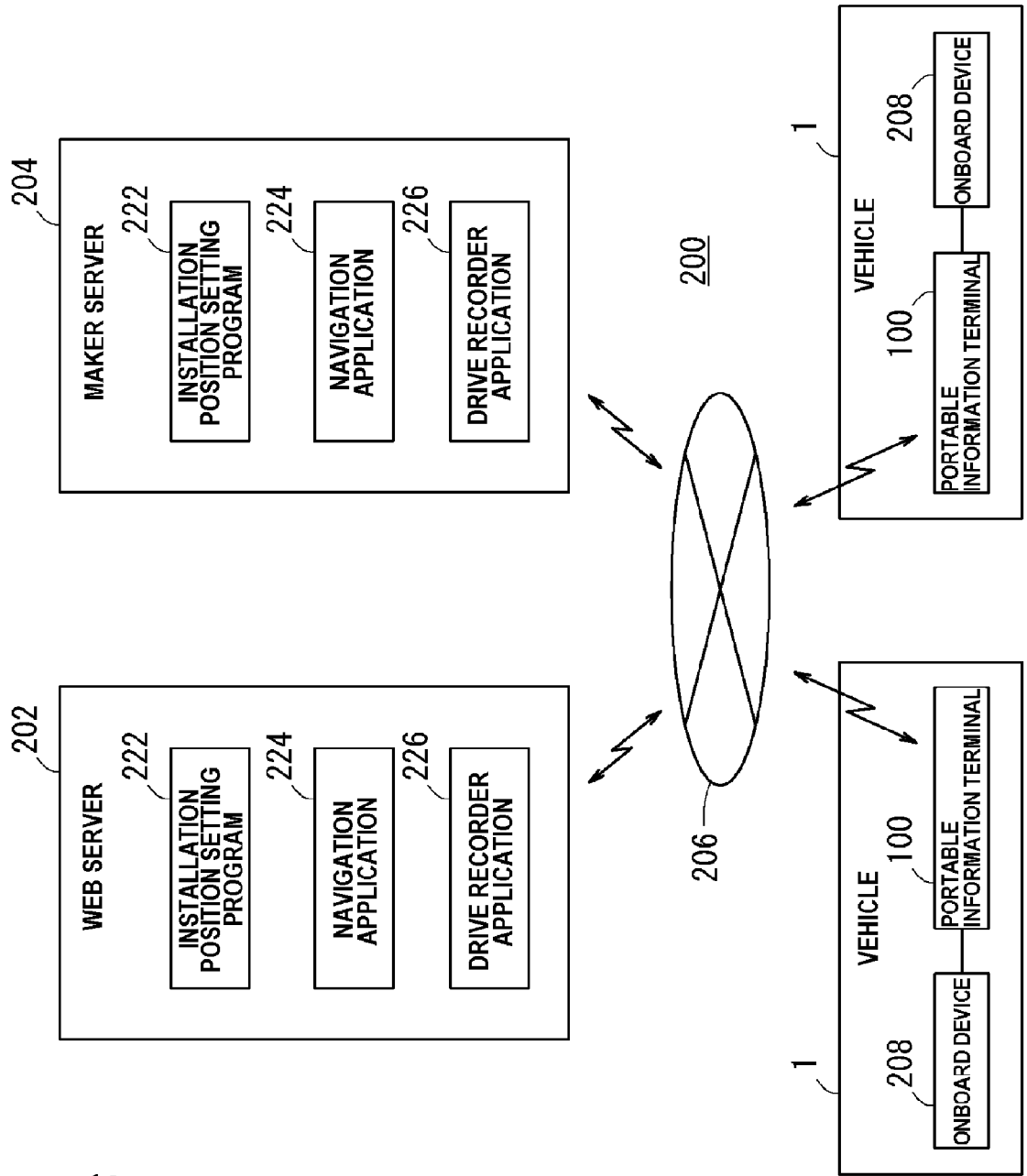
FIG. 6 is a block diagram of a configuration of a portable information terminal-linked vehicle system including plural vehicles on which the method for installing the portable information terminal on the vehicle according to the one embodiment is carried out.
Figure 7:
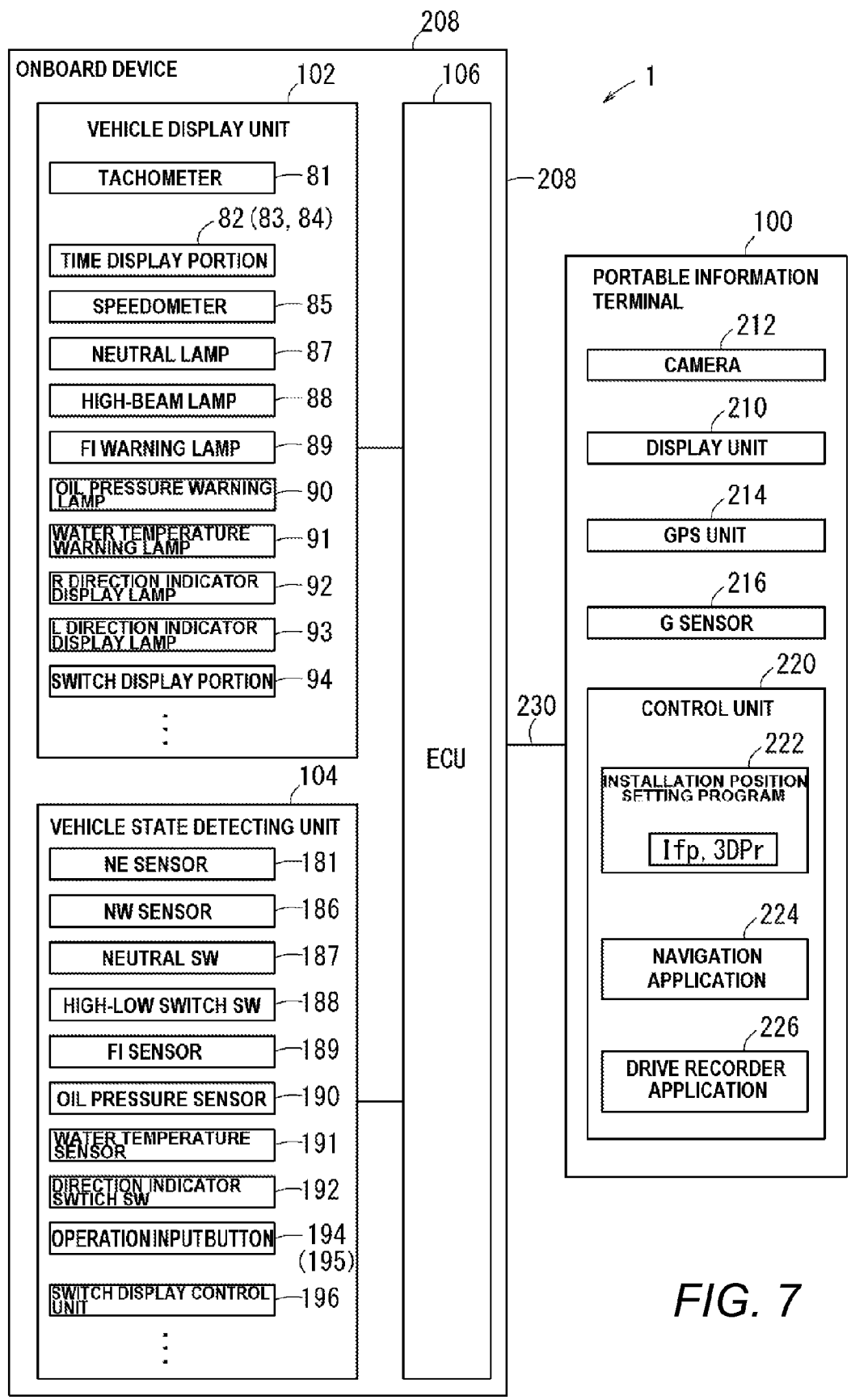
FIG. 7 is a block diagram showing a configuration of an onboard device on the vehicle and the portable information terminal.
Figure 8:
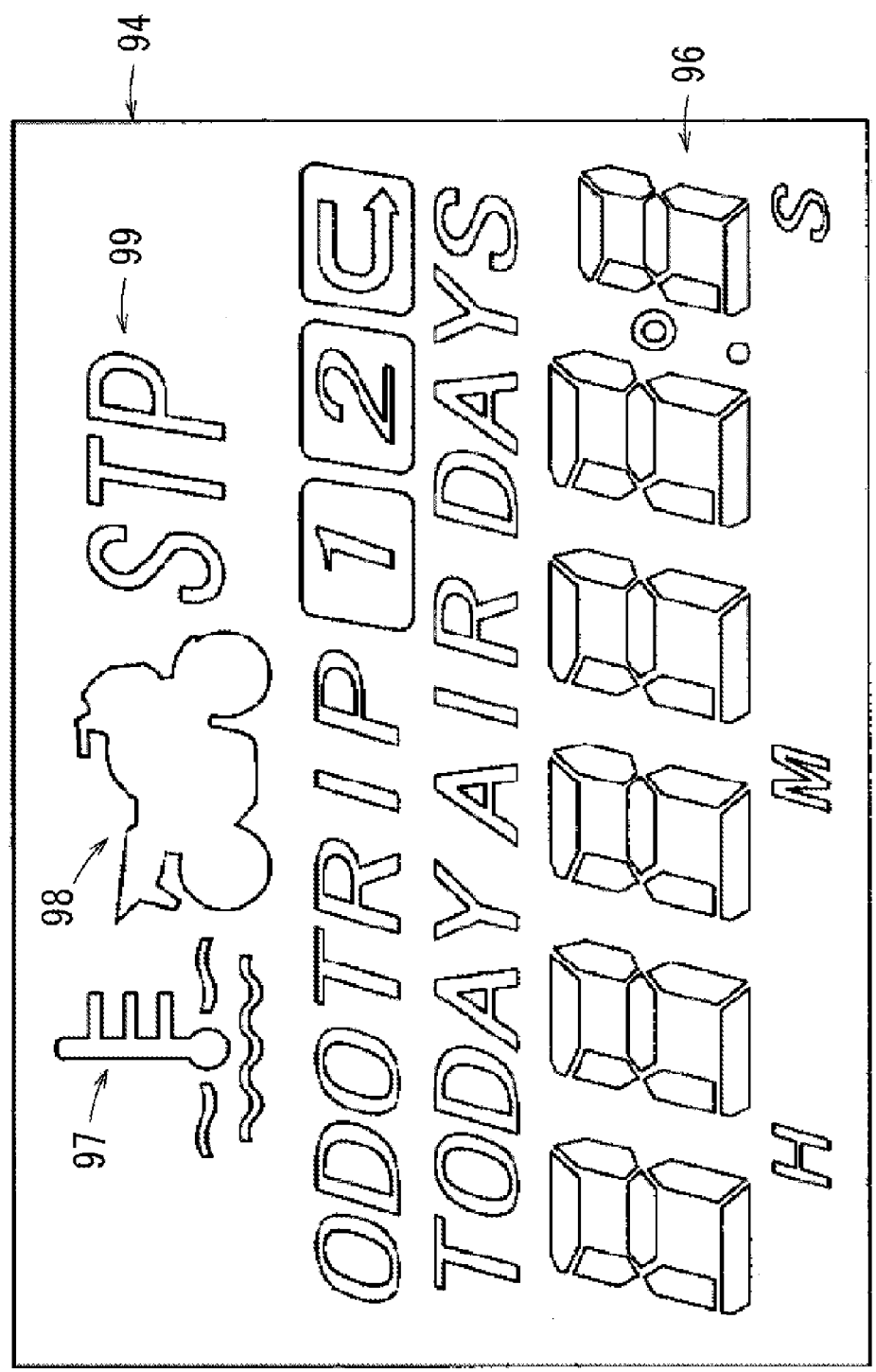
FIG. 8 is a front view of a switch display unit.

FIG. 1 is a side view of a motorcycle as a vehicle 1 on which a method for installing a portable information terminal on a vehicle according to an embodiment is carried out. FIG. 2 is an enlarged side view of the peripheries of a head pipe of the vehicle 1. FIG. 3 is a schematic perspective view showing a vehicle front part of the vehicle 1 with a portable information terminal 100 installed thereon, in an enlarged view. FIG. 4 is a schematic plan view for explaining a vehicle display unit 102. FIG. 5 is a schematic plan view of the vehicle with the portable information terminal 100 installed thereon. FIG. 6 is a block diagram of a configuration of a portable information terminal-linked vehicle system 200 including plural vehicles 1 on which the method for installing the portable information terminal 100 on the vehicle 1 according to the one embodiment is carried out. FIG. 7 is a block diagram showing a configuration of an onboard device 208 on the vehicle 1 and the portable information terminal 100. FIG. 8 is a front view of a switch display portion 94 in the vehicle display unit 102 in FIG. 4.

As shown in FIG. 6, the portable information terminal-linked vehicle system 200 is basically formed by the plural vehicles 1 including the portable information terminal 100 engaged with the onboard device 208, a web server 202 which is a website server, a maker server 204, and a communication line 206 which wirelessly connects the web server 202 and the maker server 204 with the portable information terminal 100 installed on the vehicle 1.

The communication line 206 includes the internet, a fixed communication network and a mobile communication network.

The portable information terminal 100 is formed by a mobile phone, smartphone, tablet terminal or the like, and includes a touch panel-type display unit 210, a built-in camera 212, a GPS unit 214 which is a positioning unit, a G sensor 216, and a control unit 220, as shown in FIG. 7.

The control unit 220 of the portable information terminal 100 is a computer and operates as various functional units as a CPU (central processing unit) executes programs stored in a storage unit.

As the programs, an installation position setting program 222 for setting an installation position of the portable information terminal 100 on the vehicle 1, a navigation application 224 used for route guide and a drive recorder application 226 used as a drive recorder are stored in addition to fundamental applications such as mobile phone functions including a telephone call function and a data communication function, short-range low-power communication functions such as Bluetooth (trademark registered) and Wi-Fi, and a handsfree call functions using the short-range low-power communication functions, as already known. The installation position setting program 222 is essential for carrying out the embodiment. The navigation application 224 and the drive recorder application 226 may be stored according to need.

The installation position setting program 222, the navigation application 224 and the drive recorder application 226 are stored in advance in the maker server 204 and the web server 202 shown in FIG. 6. The maker server 204 is a server which is directly managed by the manufacturer or distributor of the vehicle 1. The web server 202 is a server where the manufacturer or the like, that is, the maker permits distribution of the applications to general users, and which is arranged at a designated website.

The installation position setting program 222, the navigation application 224 and the drive recorder application 226 are downloaded and installed in a storage device of the control unit 220 of the portable information terminal 100 installed on the vehicle 1, for example, from the maker server 204 or the web server 202 via the communication line 206. These applications may be installed when the portable information terminal 100 is shipped from the plant.

As shown in FIG. 7, the onboard device 208 on the vehicle 1 includes an ECU (electronic control unit) 106 as a control unit of the vehicle 1, a vehicle display unit 102 electrically connected to the ECU 106, and a vehicle state detecting unit 104 which detects an operation and detects a vehicle state. The onboard device 208 and the portable information terminal 100 are wired to each other via a cable 230. Wireless communication may be employed. However, when wired connection is employed, DC power can also be supplied to the portable information terminal 100 from the side of the onboard device 208.

The ECU 106 of the onboard device 208 and the control unit 220 of the portable information terminal 100 are wired (via the cable 230) or wirelessly connected (via Bluetooth (trademark registered), infrared rays or the like).

The ECU 106 and the control unit 220 are computers including microcomputers and have a CPU (central processing unit), a ROM as a memory (including EEPROM), a RAM (random access memory), and also have input-output units such as A/D converter and D/A converter, a timer as a time measuring unit, and the like. The ECU 106 and the control unit 220 function as various function realizing units, for example, a control unit, an arithmetic unit, a processing unit and the like, as the CPU reads out and executes programs recorded in the ROM.

Now, the structure of the vehicle 1 will be described. As shown in FIG. 1, a front fork 3 axially supporting a front wheel 2 of the vehicle 1 is pivotally supported in a steerable manner by a head pipe 6 provided at a front end part of a vehicle body frame 5 via a steering stem 4, whereas a rear fork 8 is pivotally supported in a swingable manner by a pivot portion 9 provided at a middle part of the vehicle body frame 5. The vehicle body frame 5 is a so-called double cradle-type frame having a pair of main frames 10 and down tubes 11 branching and extending to the left and right from the head pipe 6 of the front end, and a water-cooled parallel four-cylinder engine 12 is loaded in a part surrounded by these main frames 10 and down tubes 11.

A cylinder head 16 of the engine 12 is arranged in a slightly forward leaning state on a crank case 17. A throttle body 18 corresponding to each cylinder is connected to a rear part of the cylinder head 16.

Also, an exhaust pipe 20 corresponding to each cylinder is connected to a front part of the cylinder head 16. The respective exhaust pipes 20 are gathered into one pipe as these exhaust pipes pass in front of and below the crank case 17 and extend to the rear side of the engine 12. These exhaust pipes are then connected to a silencer 21 arranged on the rear right side of the vehicle body. A radiator 22 for cooling the engine 12 is arranged in front of the head cylinder 16.

A fuel tank 23 is arranged on the top of the main frames 10. A retractable side stand 34 is arranged at a left bottom part of the vehicle body frame 5. This side stand 34 supports the vehicle 1 in a standing state where the vehicle body is leaning to the left.

On the top of a top bridge 35 of the steering stem 4, a left-right integrated handle 37 is mounted via a handle post 36. This handle 37, a seat 24 and a step 25 decide the riding position of the vehicle 1. Also, a clutch lever 57 and a brake lever 58 are installed on the handle 37, integrally to the left and right.

Also, a meter unit 38 is arranged in front of the top bridge 35. Moreover, a round single-light headlight 50 supported by a pair of left and right light brackets 49 is arranged in front of the head pipe 6.

Referring also to FIG. 2, a front end of the main frame 10 is joined to a part on the upper rear side of the head pipe 6. Also, the rear side of a lower part of the head pipe 6 and the lower side of a front part of the main frame 10 are connected by a tension pipe 39. A top end of the down tube 11 is joined to the lower side of a front part of the tension pipe 39.

A stem pipe (not shown) fixed integrally with a bottom bridge 40 extending in left-right directions penetrates the head pipe 6 and thus mounted rotatably about the axis thereof. To a top end part protruding from the head pipe 6, of this stem pipe, the top bridge 35 is fixed parallel to the bottom bridge 40. The steering stem 4 is mainly formed by the top bridge 35, the stem pipe and the bottom bridge 40. Also, each front fork 3 is fitted and fixed to both left and right end parts of the top bridge 35 and the bottom bridge 40. Each front fork 3 fixed to the steering stem 4 is pivotally supported in the state where the axial line thereof is offset forward from the axial line of the head pipe 6. The meter unit 38 is supported on the top bridge 35 by a meter stay 41. An ignition key cylinder 42 or the like is mounted on the meter stay 41.

The headlight 50 is arranged inward of the respective light bracket 49 in the direction of vehicle width and is held in such a way as to be caught by the respective light brackets 49 from the left and right sides.

In a rear part of each light bracket 49, a pair of top and bottom mounting holes to a light stay 52 fixed to the steering stem 4 is provided.

Each light bracket 49 is fixed to the light stay 52 with bolts 55. Thus, the headlight 50 is fixed to the steering stem 4 via the light brackets 49 and the light stays 52.

As shown in FIGS. 4 and 7, the vehicle display unit 102 is specifically a so-called combination meter provided on a motorcycle and is mounted on the top bridge 35 in the state of being arranged on the front side of the handle 37 and above the headlight 50.

The vehicle display unit 102 is mainly in a range of vision 73 of a driver 62 (FIG. 5) who is driving, as shown in FIG. 4. A display portion 71 (FIG. 4) which displays information about the vehicle 1 to the driver 62 is provided on the front side. An operation input portion 72 where mainly the driver 62 carries out operation inputs is provided on the rear side.

The display portion 71 is electrically connected to the vehicle state detecting unit 104 (FIG. 7), which detects information about the vehicle 1 and operations by the driver 62 or the like, via the ECU 106. The display portion 71 receives a detection signal and an operation signal from the vehicle state detecting unit 104 and displays the information about the vehicle 1.

Specifically, the display portion 71 includes an analog tachometer 81 provided on the right side of a front part, a digital time display portion 82 provided at the back of the tachometer 81, a fuel indicator 83 provided at the back of the time display portion 82, and a fuel warning display portion 84 provided on the right side of the time display portion 82.

The tachometer 81 displays the number of rotations of the engine based on a detection signal from a number of engine rotations sensor 181 which detects the number of rotations of the engine.

The time display portion 82 displays time based on an output signal from a clock within the ECU 106. The fuel indicator 83 is turned on by the ECU 106 in the form of a lit-up number corresponding to the amount of fuel left in the fuel tank 23, based on a detection signal from a fuel level sensor (not shown).

The fuel warning display portion 84 is turned on by the ECU 106 when the amount of fuel left in the fuel tank 23 reaches a predetermined value or below, based on a detection signal from the fuel level sensor. Otherwise, the fuel warning display portion 84 is off.

The display portion 71 also includes an analog speedometer 85 provided on the left side of the front part, and a theft deterrent device indicator lamp 86 provided at the back of the speedometer 85.

The speedometer 85 displays the vehicle speed based on a detection signal from a number of wheel rotations sensor 186 which detects the number of rotations of wheels.

The theft deterrent device indicator lamp 86 flashes on and off for a predetermined period of time to show that a theft deterrent device in the ECU 106 is operating, for example, when the key is removed from the ignition switch.

The display portion 71 further includes a neutral lamp 87 and a high-beam lamp 88 on a center-front stage of the front part.

The neutral lamp 87 is turned on by the ECU 106 when the transmission is neutral, and is turned off otherwise, based on a detection signal from a neutral switch 187 which detects that the transmission is neutral. The neutral lamp 87 is marked with the letter "N", which is the initial of neutral.

The high-beam lamp 88 is turned on by the ECU 106 when the headlight is in an upward lighting state, and is turned off otherwise, based on a signal from a high-low switch 188 which switches the headlight 59 to upward lighting. The high-beam lamp 88 is marked with a symbol that indicates high-beam.

The display portion 71 also includes a fuel injection device warning lamp 89, an oil pressure warning lamp 90 and a water temperature warning lamp 91 on a center-middle stage of the front part.

The fuel injection device warning lamp 89 is turned on by the ECU 106 when there is some abnormality in an electronic controlled fuel injection device, and is turned off otherwise, based on a detection signal from a fuel injection device sensor 189 which detects abnormality in the electronic controlled fuel injection device. The fuel injection device warning lamp 89 is marked with the letters "FI" indicating the fuel injection device.

The oil pressure warning lamp 90 is turned on by the ECU 106 when the amount of engine oil reaches a predetermined value or below, and is turned off otherwise, based on a detection signal from an oil pressure sensor 190 which detects that the amount of engine oil in the engine 12 reaches a predetermined value or below. The oil pressure warning lamp 90 is marked with a symbol indicating the amount of oil.

The water temperature warning lamp 91 is turned on by the ECU 106 when the temperature of cooling water reaches a predetermined value or above, and is turned off otherwise, based on a detection signal from a water temperature sensor 191 which detects the temperature of cooling water in the radiator 22. The water temperature warning lamp 91 is marked with a symbol indicating the temperature of the cooling water.

The display portion 71 also has a switch display portion 94 on a center back stage of the front part and has a left direction indicator display lamp 93 and a right direction indicator display lamp 92 at the back.

The left direction indicator display lamp 93 is made to flash on and off by the ECU 106 when a left direction indicator lamp is flashing on and off, and is turned off otherwise, based on a signal from a direction indicator switch 192 which switches the flashing between left and right direction indicator lamps. The left direction indicator display lamp 93 is marked with the symbol "←".

The right direction indicator display lamp 92 is made to flash on and off by the ECU 106 when the right direction indicator lamp is flashing on and off, and is turned off otherwise, based on a signal from the direction indicator switch 192. The right direction indicator display lamp 92 is marked with the symbol "→".

Near the left direction indicator display lamp 93 and the right direction indicator display lamp 92, operation input buttons 194, 195 at two positions forming the operation input portion 72 are provided at the back of these lamps.

The above switch display portion 94 has the display thereof controlled by a switch display control unit 196. Display modes are switched by a suitable operation of the operation input buttons 194, 195 at the two positions forming the operation input portion 72 connected to the switch display control unit 196.

The switch display portion 94 includes a cooling water temperature display mode display portion 97, a maintenance indicator 98, a stopwatch mode display portion 99, a 7-segment number display portion 96 capable of showing a 6-digit number, and the like, as shown in FIG. 8.

Then, for example, when a cooling water temperature display mode is selected and inputted by a suitable operation of the operation input buttons 194, 195 at the two positions forming the operation input portion 72, the switch display control unit 196 turns on the cooling water temperature display mode display portion 97 to display a symbol indicating the temperature of the cooling water and also turns on the number display portion 96 to display the number showing the temperature of the cooling water based on a detection signal from the cooling water temperature sensor 191.

Also, for example, when a stopwatch mode is selected and inputted by a suitable operation of the operation input buttons 194, 195, the switch display control unit 196 turns on the stopwatch mode display portion 99 to display the letters "STP".

When stopwatch measuring is executed by a suitable operation of the operation input buttons 194, 195 in this state, the switch display control unit 196 turns on the number display portion 96 to display the number showing the measured value.

Next, an embodiment of a method for setting an installation position of the portable information terminal 100 on the vehicle 1 that is basically configured as described above will be described with reference to the flowchart of FIG. 9.

The installation position setting program 222 corresponding to this flowchart is installed in advance when the portable information terminal 100 is shipped from the plant, or is downloaded and installed in the control unit 220 of the portable information terminal 100 from the maker server 204 or the web server 202 via the communication line 206 according to need.

As described above, the installation position setting program 222 is a program corresponding to the method for setting an installation position of the portable information terminal 100 on the vehicle 1, and the navigation application 224 and the drive recorder application 226 are application programs which directly provide the user with services, such as navigation (route guide) and driver recorder to the driver 62, who is a user driving the vehicle 1.

Figure 9:
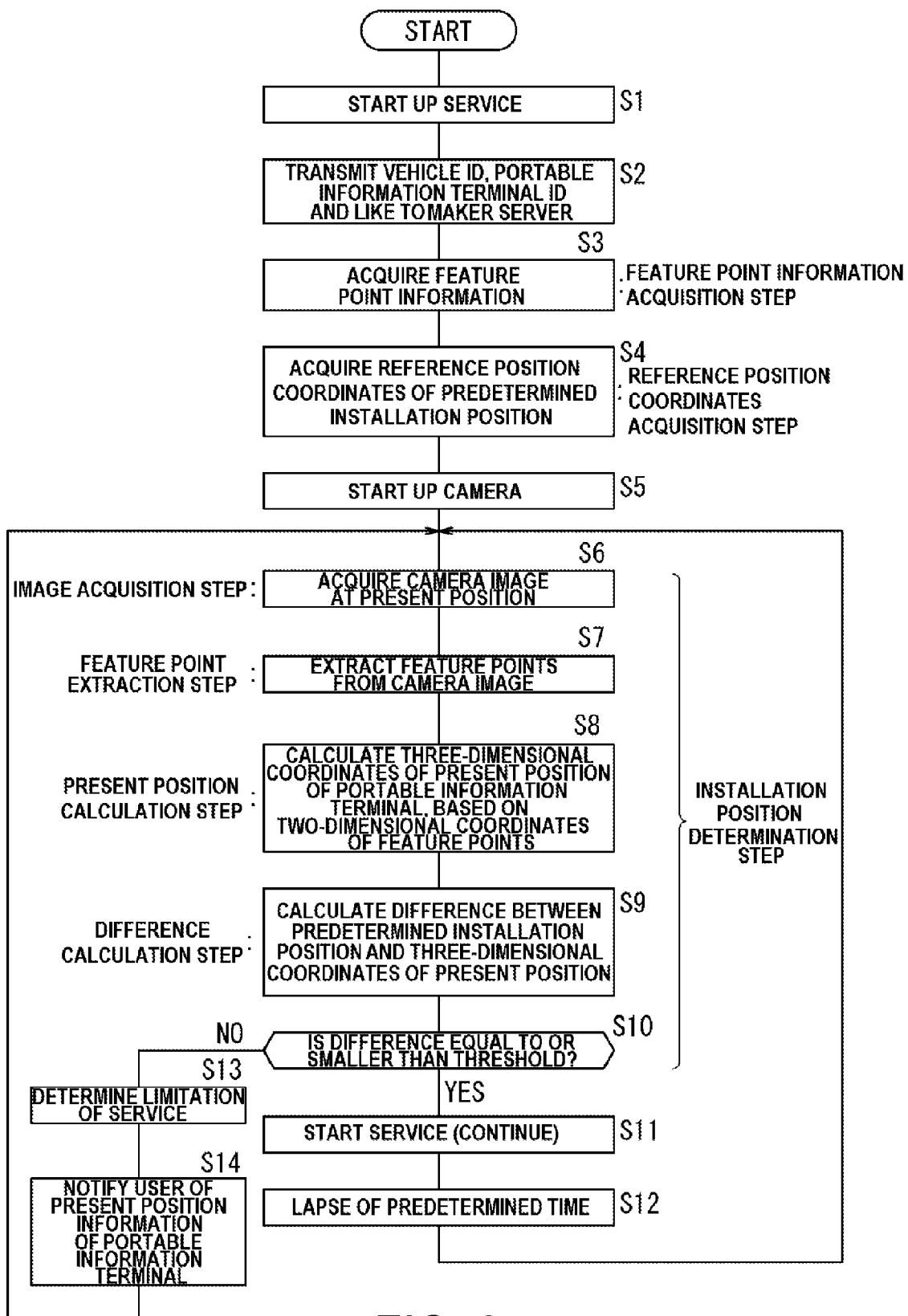
FIG. 9 is a flowchart for explaining an embodiment of a method for installing a portable information terminal on a vehicle according to the embodiment.

As an example, the flowchart of FIG. 9 shows the flowchart of the installation position setting program 222 for the portable information terminal 100 when the provision of a service by the navigation application 224 is received.

The installation position setting program 222, the navigation application 224 and the drive recorder application 226 may be installed in advance in the portable information terminal 100 when the portable information terminal 100 is sold.

In step S1, the navigation application 224 is started as a service application and the installation position setting program 222 is also started.

In step S2, the control unit 220 acquires a vehicle ID as vehicle identification information such as vehicle number and transmits this vehicle ID, a machine type ID which is the portable information terminal ID as own portable information terminal identification information, and an application ID as the application identification information of the navigation application 224 by which the provision of a service is received, to the maker server 204 via the communication line 206.

In step S3, the control unit 220 takes into the installation position setting program 222 feature point information Ifp which is two-dimensional coordinate information of a feature point fp planned to be picked up by the camera 212 of the portable information terminal 100 installed at a predetermined installation position Pr corresponding to the vehicle ID, the machine type ID and the application ID, transmitted from the maker server 204 (see FIG. 7).

To facilitate understanding of the feature point information Ifp, when the portable information terminal 100 having the machine type ID is installed at an optimum predetermined installation position Pr to execute the navigation application 224 having the application ID, on the vehicle 1 having the vehicle ID, a camera image containing seven of the above-described feature points fp planned to be acquired by the camera 212 of the portable information terminal 100 is referred to as a reference camera image Ir.

The feature point information Ifp prescribes respective two-dimensional coordinates 2Dfpr from an origin in the reference camera image Ir, of the seven feature points fp that are not flush with each other in the vehicle 1. The origin is the origin of the respective two-dimensional coordinates 2Dfpr and is set at an arbitrary point in the reference camera image Ir, for example, the vertically and horizontally central position.

Also, the manufacturer of the vehicle 1 may prepare in advance a reference camera image Ir corresponding to the machine type ID of the portable information terminal 100, the vehicle ID of the vehicle 1 and the application ID of the navigation application 224 and store the prepared the reference camera image Ir in the installation position setting program 222 in the maker server 204 and/or the web server 202 shown in FIG. 6, though the data volume increases.

Next, in step S4, the control unit 220 takes into the installation position setting program 222 three-dimensional coordinate 3DPr as reference position coordinates of the predetermined installation position Pr of the portable information terminal 100 on the vehicle 1, transmitted simultaneously with the feature point information Ifp from the maker server 204 (see FIG. 7).

Here, the reference position coordinates are not limited to one position or attitude and may be set at plural positions or cover a predetermined range.

The three-dimensional coordinates 3DPr as the reference position coordinates can also be calculated by the control unit 220 as the three-dimensional coordinates of the position of the camera 212 of the portable information terminal 100, that is, the predetermined installation position Pr of the portable information terminal 100 on the vehicle 1, based on the geometrical positional relation expressed by the two-dimensional coordinates 2Dfpr of the seven feature points fp included in the feature point information Ifp and three-dimensional coordinates 3Dfp that are already known of each feature point fp.

In practice, each of the actual feature points fp on the vehicle 1 is preset by the manufacturer of the vehicle 1 at a predetermined position on a predetermined vehicle component such as the vehicle display unit 102 fixed on the vehicle 1. Therefore, the three-dimensional coordinates 3Dfpr of each feature point fp are already known to the manufacturer. The origin of these three-dimensional coordinates 3Dfpr is arbitrary and is set, for example, at the center position of the oil pressure warning lamp 90, which is one of the feature points fp, as shown in FIG. 3. The three-dimensional coordinates 3Dfp are in a three-axis orthogonal coordinate system, where X direction is the direction of vehicle width, Y direction is the direction of vehicle axis, and Z direction is the vertical direction.

In this embodiment, the three-dimensional coordinates 3Dfpr of each feature point fp are stored in the ROM of the ECU 106. However, the three-dimensional coordinates 3Dfpr of each feature point fp may be stored in the installation position setting program 222 in the maker server 204 and/or the web server 202, corresponding to the vehicle ID.

Next, in step S5, the camera 212 is started up. In step S6, a camera image Ic at a present position Pc which is the present installation position of the portable information terminal 100 is acquired.

Next, in step S7, at least six of the feature points fp are extracted from the acquired camera image Ic.

In this step S7, for example, the ECU 106 and the control unit 220 of the portable information terminal 100 are linked to each other, and light emitting portions of the vehicle display unit 102 on which the seven feature points fp are set are turned on simultaneously when the camera picks up the image. Thus, the feature points fp can easily be extracted from the camera image Ic at night or in a dark place. In a bright place, the light emitting portions need not be turned on when the camera picks up the image. Therefore, the feature points fp may be set in parts that are not light emitting portions of the vehicle display unit 102. The feature points may also be set on other predetermined vehicle components than the vehicle display unit 102.

Figure 10:
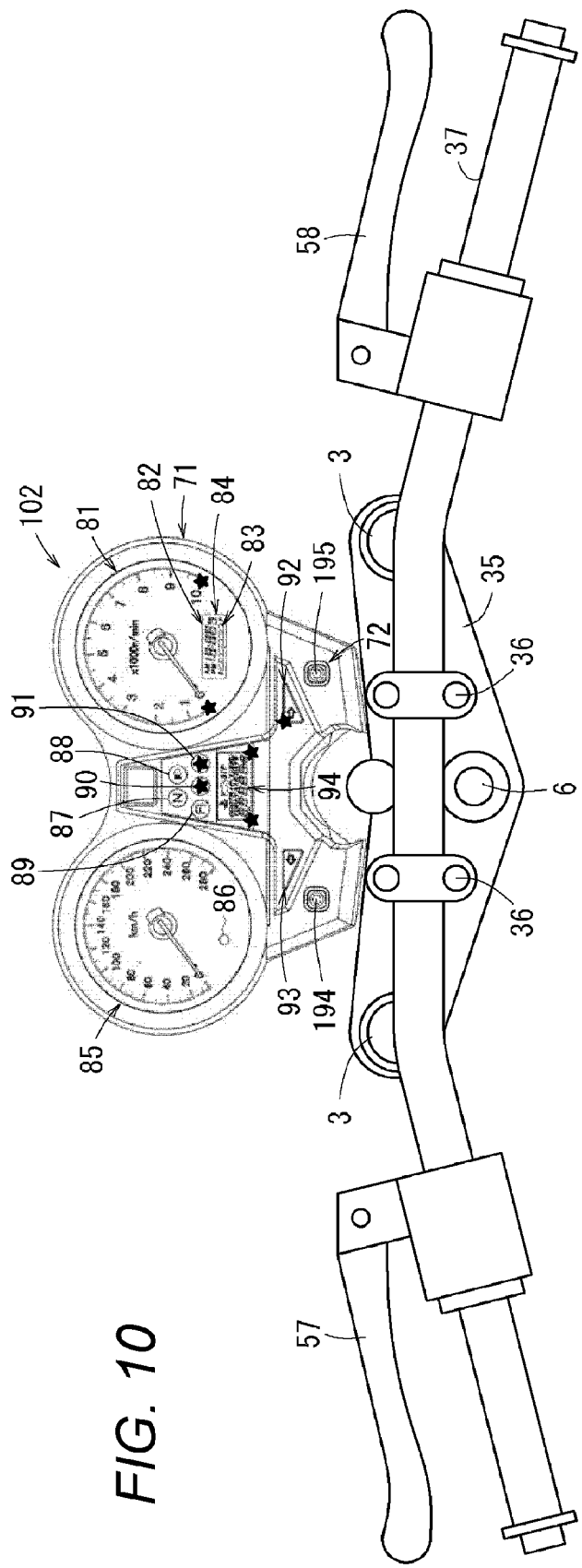
FIG. 10 is an explanatory view of feature points set on vehicle components.

In this embodiment, the seven feature points fp are two points at both ends of an arcuate self-illuminating ring (arc) around the tachometer 81, two points at the center of each of the oil pressure warning lamp 90 and the water temperature warning lamp 91, two points at the two bottom corners of a display frame of the switch display portion 94, and one point at the top left corner of the right direction indicator display lamp 92, which are marked with stars in FIG. 10.

Thus, in step S7, the seven feature points fp on the self-illuminating ring of the tachometer 81, the oil pressure warning lamp 90, the water temperature warning lamp 91 and at the two bottom corners of the display frame of the switch display portion 94 are extracted from the camera image Ic by pattern recognition or the like, and two-dimensional coordinates 2Dfpc of each feature point fp from the origin on the camera image Ic are calculated.

Next, in step S8, three-dimensional coordinates 3Dpc of the present position Pc of the portable information terminal 100 are calculated with reference to the three-dimensional coordinates 3DPr of the predetermined installation position Pr of the portable information terminal 100, based on the difference between the two-dimensional coordinates 2Dfpc of each feature point fp on the camera image Ic calculated in step S7 and the two-dimensional coordinates 2Dfp of each feature point fp on the reference camera image Ir acquired in step S3.

Here, according to the technique disclosed in the above JP-A-63-133002, when the three-dimensional coordinates 3Dfp prescribing the geometrical positional relation of the at least six feature points fp that are set on an object, in this embodiment, on the vehicle display unit 102 as a predetermined vehicle component, and that are not flush with each other are known, the three-dimensional coordinates 3DPc of the present position Pc of the camera 212 can be calculated based on the two-dimensional coordinates 2Dfpc on the camera image Ic of the plural feature points fp picked up by the camera 212.

Next, in step S9, the three-dimensional coordinates 3DPc of the present position Pc of the portable information terminal 100 are compared with the three-dimensional coordinates 3DPr of the predetermined installation position Pr of the portable information terminal 100, and the difference between the two is calculated.

In step S10, it is determined whether the difference between the three-dimensional coordinates 3DPc of the present position Pc and the three-dimensional coordinates 3DPr of the predetermined installation position Pr is equal to or smaller than an appropriate threshold value to receive the provision of the service of the navigation application 224. Also, this threshold value is acquired simultaneously with the download of the installation position setting program 222 in step S3.

In this case, if smoothing is carried out in step S9, such as taking the moving average of the three-dimensional coordinates 3DPc of the present position Pc corresponding to a predetermined number of times in the past in consideration of variance due to engine vibration, traveling vibration or the like of the vehicle 1, when calculating the three-dimensional coordinates 3DPc of the present position Pc of the camera 212, changes in the difference due to the vibration or the like can be restrained and accurate determination can be realized in step S10.

If the difference between the three-dimensional coordinates 3DPc of the present position Pc and the three-dimensional coordinates 3DPr of the predetermined installation position pr is equal to or smaller than the threshold value (step S10: YES), the present position Pc is regarded as coinciding with the predetermined installation position Pr, that is, the portable information terminal 100 is regarded as installed at the predetermined installation position Pr on the vehicle 1. Therefore, the service of the navigation application is started in step S11.

After the service is started, the control unit 220 of the portable information terminal 100 measures a predetermined time period (for example, set to every second to every few hours) in step S12, and when the time period passes, the control unit 220 repeats the processing of step S6 and the subsequent steps again. In the repetition, an installation position determination step including the image acquisition step S6, the feature point extraction step S7, the present position calculation step S8, the difference calculation step S9 and the difference determination step S10 is executed, as shown in FIG. 9.

Meanwhile, if the difference between the three-dimensional coordinates 3DPc of the present position Pc of the portable information terminal 100 and the three-dimensional coordinates 3DPr of the predetermined installation position Pr exceeds the threshold value in step S10 (step S10: NO), service limitation determination processing is carried out in step S13.

An example of this service limitation determination processing will be described. The navigation application 224 has a function to cause the display unit 210 of the portable information terminal 100 to display a real image of a landscape including a landmark or the like during the route guide service utilizing the GPS unit 214. Therefore, if the installation position of the portable information terminal 100 is shifted from the predetermined installation position Pr, the range of vision 73 of the driver 62 (FIG. 5) and a camera angle of view 250 of the camera 212 loaded on the portable information terminal 100 become misaligned from a predetermined positional relation and there is no point in displaying the real image of the landscape on the display unit 210. Therefore, in this case, it is determined in step S13 that the real image display service should be limited.

The camera angle of view 250 refers to an angle (in panning direction and tilting direction) indicating a range of image (scene) picked up by the camera 212, which is decided by the focal length of the lens of the camera 212 and the area of the optical sensor of the camera 212, as publicly known. Here, the predetermined installation position Pr of the portable information terminal 100 may preferably be a position where the feature points fp, the landscape in the front and operation parts can be picked up within the camera angle of view 250 of the camera 212 without hiding the vehicle display unit 102 including the meter and indicators from the range of vision 73 of the driver 62, as shown in FIG. 5.

Following the service limitation determination in step S13, it is reported in step S14 via a sound and an image display on the display unit 210 that the present position Pc of the portable information terminal 100 is not installed at the predetermined installation position Pr where the provision of a desired service, in this case, the route guide service, can be received entirely. If the route guide service is already being carried out using the portable information terminal 100, an interrupt is made and the processing of step S14 is carried out.

Figure 11:
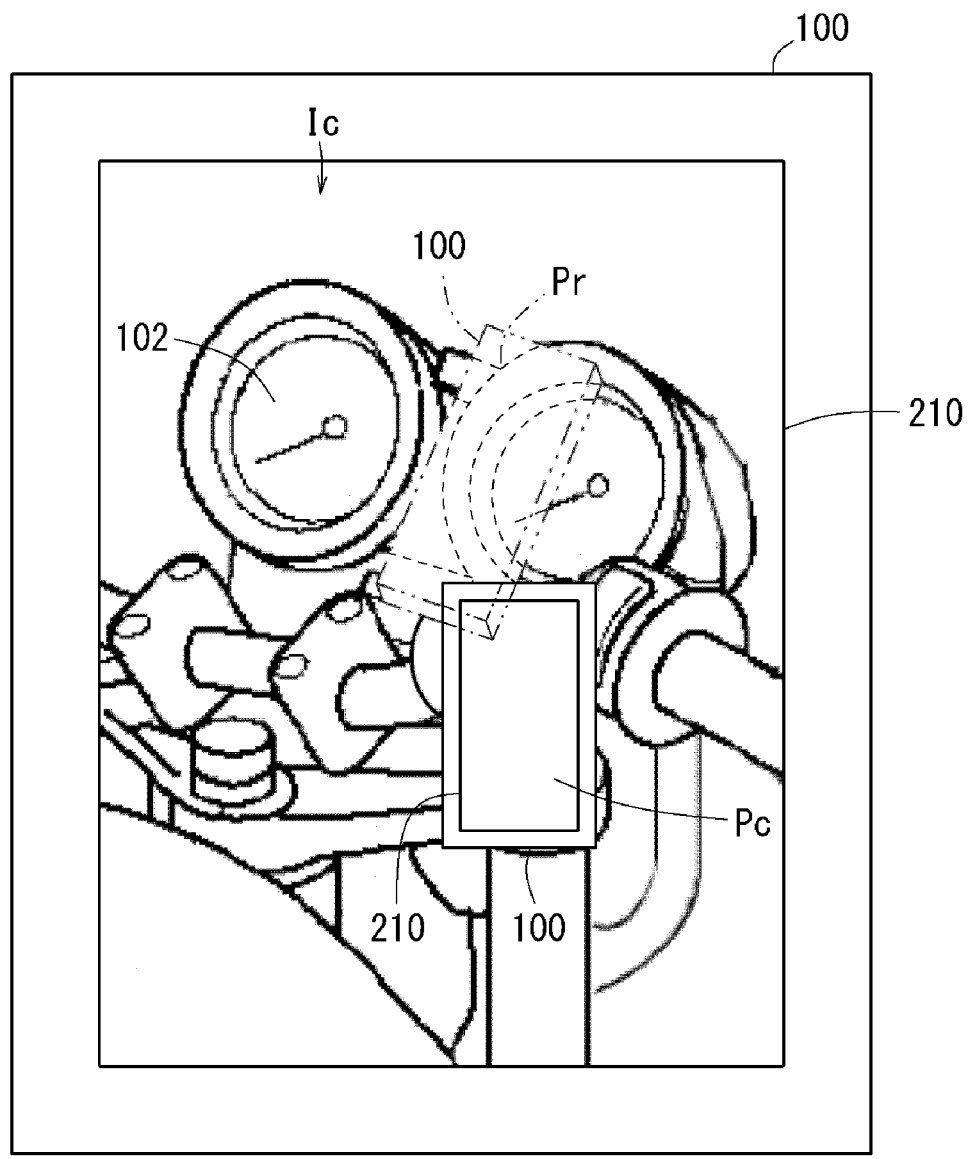
FIG. 11 is an explanatory view showing an example of a screen that guides the installation position of the portable information terminal to a predetermined installation position.

In the processing of step S14, on the display unit 210 of the portable information terminal 100, the predetermined installation position Pr of the portable information terminal 100 is shown in the form of a semitransparent display or the like indicated by double chain-dotted lines, and the present position Pc is shown in a fixed upright state indicated by solid lines at a predetermined position in the screen, in the camera image Ic, which is a real image including the vehicle display unit 102 and the real-time landscape or the like picked up by the camera 212 of the portable information terminal 100, for example, in the state shown in FIG. 3, as shown in FIG. 11.

If such a display is shown, the camera image Ic can guide the user to find a direction of movement of the installation position of the portable information terminal 100 where the predetermined installation position Pr and the present position Pc coincide with each other.

Figure 12:
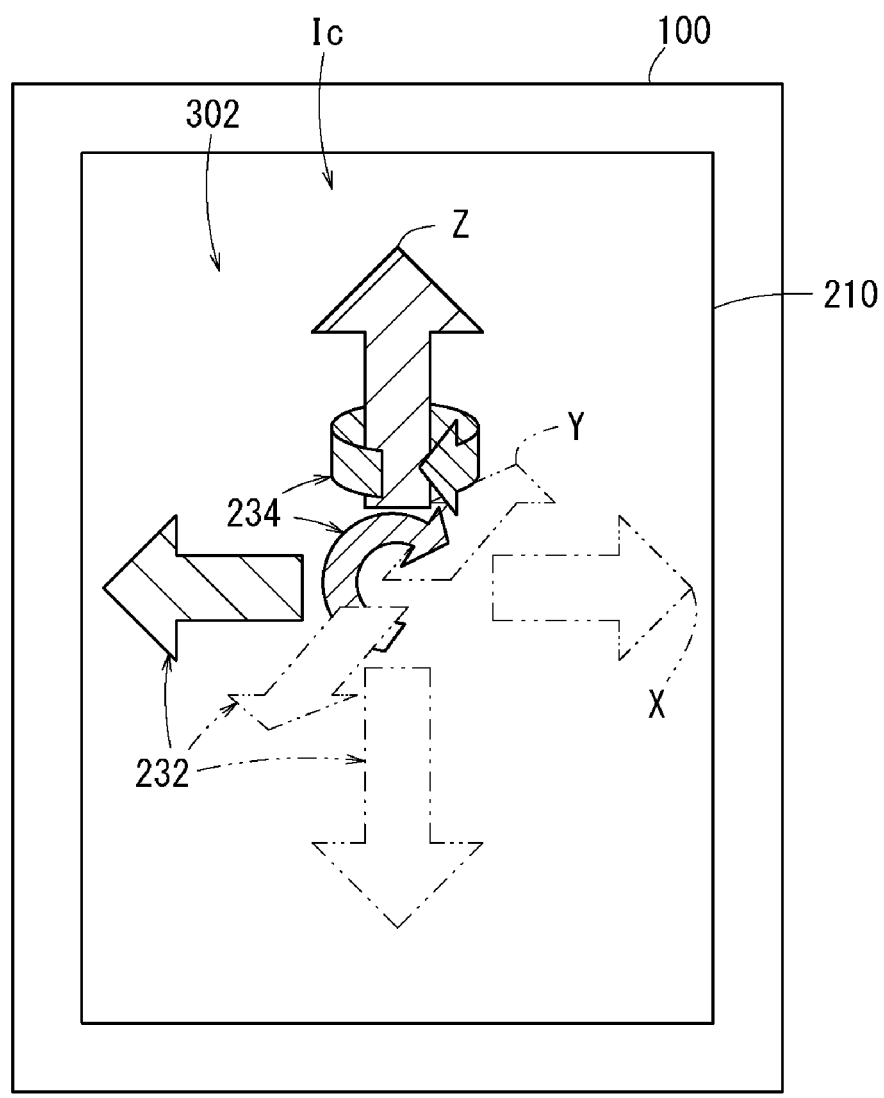
FIG. 12 is an explanatory view showing another example of the screen that guides the installation position of the portable information terminal to a predetermined installation position.

In another processing of step S14, as shown in FIG. 12, while the camera image Ic is displayed on the display unit 210 (the display is not shown in FIG. 12), arrows 232 in X, Y and Z directions in the same three-axis orthogonal coordinate system as the three-axis orthogonal coordinate system shown in FIG. 3 and an image 302 showing arrows 234 in rotation directions about each axis in these X, Y and Z directions (the arrow in the rotation direction about X axis is not shown) are displayed.

In the display example of FIG. 12, hatched semitransparent arrows indicate directions in which the user is guided to move the portable information terminal 100. In this case, the user is guided to move the portable information terminal 100 in an upper left direction, then rotate to the left about the axis in Z direction, and rotate to the right about the axis in Y direction.

When the determination in step S10 is made, all the arrows 232 become non-hatched semitransparent and the arrows 232, 234 disappear. The amount of movement and the amount of rotation may also be expressed by the color density, length, blink interval and the like of the arrows.

As described above, according to the embodiment, when the portable information terminal 100 is installed at the predetermined installation position Pr on the handle 37 or the like of the vehicle 1, the control unit 220 of the portable information terminal 100 executes the installation position setting program 222. By this execution, the camera 212 mounted via a suitable stay 101 and a cradle (not shown) on the handle 37 of the vehicle 1 acquires the camera image Ic at the present position Pc of the camera 212 (step S6), and it is determined whether the portable information terminal 100 is installed at the predetermined installation position Pr or not, based on whether a predetermined vehicle component of the vehicle 1, in this embodiment the vehicle display unit 102 on which seven feature points fp are set, exists at the position of predetermined two-dimensional coordinates 2Dfp on the acquired camera image Ic or not (step S10). If the portable information terminal 100 is determined as not installed at the predetermined installation position Pr, a notification to that effect is provided in the form of an image on the display unit 210 of the portable information terminal 100 (the guide images of FIGS. 11 and 12) or in the form of a sound from a speaker (the vehicle 1 or the portable information terminal 100).

With this notification, the user such as the driver 62 can be made aware that the present position Pc of the portable information terminal 100 on the vehicle 1 should be limited to the predetermined installation position Pr.

The camera image Ic acquired by the camera 212 of the portable information terminal 100 installed at the predetermined installation position Pr on the handle 37 or the like is the reference camera image Ir in which each feature point fp on the vehicle display unit 102 exists at the position of the predetermined two-dimensional coordinates 2Dfpr on the camera image Ic. The position of the camera 212, that is, the position of the portable information terminal 100 where this reference camera image Ir can be picked up, is preset to an appropriate position to receive a predetermined service such as navigation.

In the embodiment, the service provided for the user by the portable information terminal 100 is the route guide service (navigation service). However, a drive recorder service can also be provided.

The pickup position of the camera image Ic is different between the drive recorder service and the route guide service. In the route guide service, the predetermined installation position Pr is so set that the road and a landmark appear in the camera image. However, in the drive recorder service, the camera angle of view 250 is set further downward, that is, the tilting angle of the camera 212 is set downward, as shown in FIG. 2. Thus, the pickup position, that is, the predetermined installation position Pr is so set that a part of the front wheel 2 as well as the plural feature points fp appear in the camera image.

When a G value exceeding a threshold value is detected by the G sensor 216 of the portable information terminal 100 or a specific operation on the portable information terminal 100 is detected during the provision of the drive recorder service, a video of a predetermined duration before and after a collision which is useful for analyzing the cause of an accident can be provided by transmitting a video that is an image acquired by the camera 212 during a predetermined time period before and after the detection to the maker server 204 or the like via the communication line 206.

The invention is not limited to the embodiment. As a matter of course, based on the description of this specification, various configurations can be employed, for example, as follows.

Request information including the machine type ID, the vehicle ID and the application ID of the service which the user wants to be provided is transmitted from the portable information terminal 100 installed on the vehicle 1 to the maker server 204 or the like via the communication line 206. A reference camera image Ir which is a real image planned to be picked up by camera 212 of the portable information terminal 100 at the predetermined installation position Pr of the vehicle 1 (for example, an image picked up in advance, containing predetermined vehicle components including meters such as the tachometer 81 and indicators such as the neutral lamp 87) corresponding to the request information is transmitted as response information from the maker server 204 or the like to the portable information terminal 100 via the communication line 206. The embodiment also includes deciding the installation position of the portable information terminal 100 on the vehicle 1 in such a way that the camera image Ic, which is a real image picked up by the camera 212 of the portable information terminal 100 installed on the vehicle 1, becomes the same image as the reference camera image Ir, which is similarly a real image.

Also, the predetermined installation position of the portable information terminal 100 may be set in such a way that the portable information terminal 100 is installed on a vehicle component which is arranged to the rear side of the handle 37 such as on the fuel tank 23 and which does not turn together with the handle 37 so that an image containing the front of the vehicle 1 and the handle 37 can be picked up, instead of on the handle 37. By installing the portable information terminal 100 on the vehicle component (fuel tank 23 or the like), then picking up an image showing a relative angle displacement from the handle 37 by the camera 212 of the portable information terminal 100 and taking in the camera image Ic, the steering angle of the handle can be detected. However, in this case, feature points fp may be set on the vehicle component.

In the embodiment, the vehicle display unit 102 which is a predetermined vehicle component on which seven feature points fp including a redundant feature point are set is turned on synchronously with the image pickup timing of the camera 212. Therefore, the embodiment can be carried out even at night. If the feature points fp are set at positions illuminated by a spotlight of the portable information terminal 100, the embodiment can be carried out similarly at night.

Figure 13A:
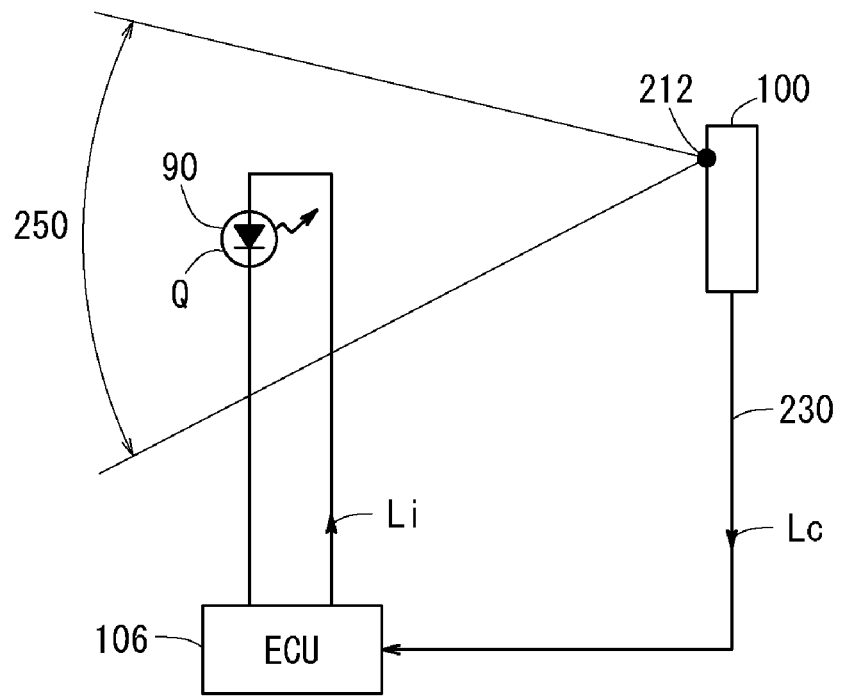
FIG. 13A is a diagram of a circuit for causing a light emitting unit corresponding to specific feature points to emit light according to command timing from a control unit.
Figure 13B:
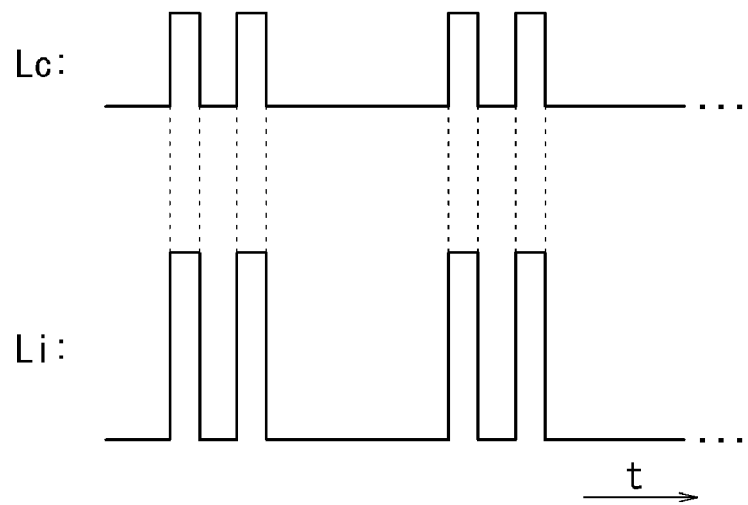
FIG. 13B is a timing chart of the light emission command and light emitting current.

When light emitting parts that flash according to a command from the ECU 106 are set as feature points fp, the control unit 220 of the portable information terminal 100 and the ECU 106 are linked to each other and light emission is controlled via the ECU 106 to achieve timing and volume of light as instructed by a light emission command LC from the control unit 220 of the portable information terminal 100, as shown in FIGS. 13A and 13B. A light emission current Li is supplied from the ECU 106 to a specific light emitting part, for example, the water temperature warning lamp 91. Thus, a specific feature point Q can be extracted more easily by the control unit 220 of the portable information terminal 100.

Also, when two or more light emitting parts are made to emit light in the timing as instructed by a light emission command from the control unit 220, light emission commands at different timings are issued. Thus, the respective light emitting parts can be specified more easily.

Referring to the description of JP-A-63-133002, the present position Pc as the geometrical position of the portable information terminal 100 can be specified if there are at least six feature points fp. However, in this embodiment, since seven feature points fp (there may be eight or more) including a redundant point are used, position detection errors due to feature point extraction errors can be minimized. Even when one of the seven points cannot be read because of stain or the like, the embodiment can be carried out if the six feature points fp can be specified. In this case, trouble with the vehicle component corresponding to the feature point fp that cannot be specified (detected) because of trouble due to stain or the like on the camera lens or because of trouble with the vehicle component on which the feature points are set, can be specifically reported to the driver 62 or the like in the form of an image on the portable information terminal 100 or a sound from a speaker or the like.

Moreover, if the predetermined installation position of the portable information terminal 100 is set at a position including a specific operation part (brake lever 58, clutch lever 57 or the like) loaded in the vehicle 1 which the user such as the driver 62 manually operates, whether the operation part is operated or not can be determined from an image.

The predetermined installation position Pr of the portable information terminal 100 may also be taken in and decided by the user using the camera 212 of the portable information terminal 100. If the predetermined installation position is decided in this manner, the portable information terminal can be installed at the same position as the previous installation position in response to the user's request and the camera 212 of the portable information terminal 100 can also be utilized, for example, for fixed point observation or the like in the town.

The installation position of the portable information terminal 100 is not limited to a position on the vehicle 1 which is a motorcycle. Of course, the portable information terminal may be installed on a four-wheel automobile. The portable information terminal may also be installed at the entrance of a house so that the provision of security services can be received from a security company.

The throttle position, vehicle speed, number of engine rotations and brake oil pressure may be taken into the portable information terminal 100 from the vehicle 1 and may be transmitted to the maker server 204.

The stay 101 to fix the portable information terminal 100 on the handle 37 or the like of the vehicle 1 may preferably have a joint portion so that the position and attitude of the portable information terminal 100 can be changed to a certain extent in the state where the portable information terminal 100 is mounted on the stay 101. In this case, it is convenient if the portable information terminal 100 is mounted on the stay 101 installed on (the vehicle body of) the vehicle 1, then positioned via the installation position setting program 222 and fixed in the position by tightening the clamp of the joint portion where the position is decided.

Also, the portable information terminal 100 is not limited to a mobile phone, smartphone, tablet terminal or the like and may be anything that has a CPU as a control unit, a camera, and an image display unit.

In this section, reference numerals shown in the accompanying drawings are used for the description in order to facilitate understanding. Therefore, the content described in this section should not be interpreted as limited to the configuration denoted by these reference numerals.

[1] A method for determining an installation position of a portable information terminal on a vehicle according to the embodiment is a method for determining an installation position of a portable information terminal (100) on a vehicle (1), executed as a control unit (220) of the portable information terminal (100) having a camera (212) reads a program. The method includes: an image acquisition step (S6) in which a present camera image showing a camera image at a present position of the camera (212) installed on the vehicle (1) is acquired; an installation position determination step (S10) in which whether the portable information terminal (100) is installed at a predetermined installation position on the vehicle (1) or not is determined, based on a position of a predetermined vehicle component (102) of the vehicle (1) in the present camera image; and a notification step (S14) in which if the portable information terminal is determined as not installed at the predetermined installation position (S10: NO) in the installation position determination step (S10), a notification to that effect is provided from the portable information terminal (100).

According to the embodiment, if the portable information terminal is not installed at the predetermined installation position on the vehicle, a notification to that effect is provided. Therefore, the user can be made to limit the installation position of the portable information terminal on the vehicle to the predetermined installation position. The camera image acquired by the camera of the portable information terminal installed at the predetermined installation position is an image showing that the predetermined vehicle component exists at the predetermined position in the camera image. A predetermined installation position of the camera where the camera can pick up such a camera image may be set in the portable information terminal in advance as an appropriate position to receive a predetermined service, for example, to use as a drive recorder or the like.

[2] Here, it is preferable that an application (224, 226) providing a user of the vehicle (1) with a predetermined service is recorded in the portable information terminal (100) and that the method further includes a predetermined service limitation step (S13) in which the provision of the predetermined service is limited at least partly if the portable information terminal is determined as not installed at the predetermined installation position in the installation position determination step (S10).

According to the embodiment, if the portable information terminal is not installed at the predetermined position, the provision of the predetermined service by the application is limited at least partly. Therefore, the user can be effectively made to limit the installation position of the portable information terminal on the vehicle to the predetermined installation position.

[3] Also, the installation position determination step (S10) may further include a feature point extraction step (S7) in which plural feature points set on the predetermined vehicle component (102) are extracted from the present camera image of the portable information terminal (100), and a present position calculation step (S8) in which present position coordinates expressing three-dimensional coordinates of the present position of the portable information terminal (100) are calculated from two-dimensional coordinates of each of the feature points that are extracted. In the installation position determination step (S10), it may be determined whether the present position coordinates of the portable information terminal (100) that are calculated coincide with reference position coordinates expressing three-dimensional coordinates of the predetermined installation position or not.

According to the embodiment, the feature point extraction step in which plural feature points set on the predetermined vehicle component are extracted from the present camera image of the portable information terminal, and the present position calculation step in which present position coordinates expressing three-dimensional coordinates of the present position of the portable information terminal are calculated from two-dimensional coordinates of the plural feature points that are extracted, are further provided. Therefore, whether the present position of the portable information terminal is the predetermined installation position or not can be determined easily and at a low calculation cost.

[4] In this case, it is preferable that the notification step (S14) includes an installation position guidance step in which when the present position of the portable information terminal (100) does not coincide with the predetermined installation position, guidance is given by an image (232, 300) or sound so that the present position of the portable information terminal (100) coincides with the predetermined installation position.

According to the embodiment, when the present position of the portable information terminal does not coincide with the predetermined installation position, guidance is given by an image or sound so that the present position coincides with the predetermined installation position. Therefore, the setting work to the predetermined installation position by the user can be simplified while how close the portable information terminal is to the predetermined installation position on the vehicle is reported live to the user.

[5] Also, it is preferable that in the installation position calculation step (S8), the predetermined vehicle component (102) on which the plural feature points are set is one or plural (15, 30, 38, 47, 53) and the number of the feature points is set to a number that is necessary to calculate the preset position coordinates of the portable information terminal (100) plus redundancy, and that when the present position coordinates of the portable information terminal (100) are determined as coinciding with the reference position coordinates but there is a feature point that is not detected in the acquired camera image, a notification to that effect is provided from the portable information terminal (100) in the notification step (S14).

According to the embodiment, since the feature points set on the predetermined vehicle component are set to a number that is necessary to calculate the present position coordinates of the portable information terminal plus redundancy, position calculation errors due to feature point extraction errors can be minimized. Also, since a feature point that is not detected is reported, the user can be notified of stain or the like on the camera lens and trouble with the predetermined vehicle component on which the feature points are set.

[6] Feature point information indicating the plural feature points that are planned to be picked up by the camera (212) of the portable information terminal (100) installed at the predetermined installation position may be recorded in an external server (202, 204), using a combination of a machine type ID of the portable information terminal (100) and a vehicle ID of the vehicle (1) as a parameter. The portable information terminal (100) may have a communication function and download the feature point information corresponding to the machine ID of the portable information terminal (100) and the vehicle ID of the vehicle (1) from the external server (202, 204) via a communication line (206).

According to the embodiment, if feature point information is recorded in the external server, corresponding to each machine ID of the portable information terminal and each vehicle ID of the vehicle, the portable information terminal can download necessary feature point information alone via the communication line.

[7] In this case, the method may include a feature point information acquisition step (S3) in which when the control unit (220) of the portable information terminal (100) is wired or wirelessly connected to a vehicle control unit (106) of the vehicle (1), the control unit (220) of the portable information terminal (100) acquires the vehicle ID from the connected vehicle control unit (106) and downloads the feature point information corresponding to the acquired vehicle ID and the machine type ID from the external server (202, 204), before the image acquisition step (S6).

According to the embodiment, feature point information that matches the portable information terminal and the vehicle can be downloaded easily.

[8] By setting a light emitting unit (90) controlled in light emission by the control unit (106) of the vehicle (1), as at least one of the predetermined vehicle components, of the predetermined vehicle components (102) on which the plural feature points are set, and controlling light emission of the light emitting unit (90) via the control unit (106) in accordance with a light emission command from the control unit (220) of the portable information terminal (100), at least the one predetermined vehicle component can be extracted accurately and quickly from the present camera image.

[9] Moreover, the predetermined service provided by the application (224) may be a route guide service.

[10] Furthermore, it is preferable that the predetermined service provided by the application is a drive recorder service and when a G value exceeding a threshold value is detected by a G sensor (216) provided in the portable information terminal (100) or when a specific operation on the portable information terminal (100) is detected, the drive recorder service transmits an image acquired by the camera (212) during a predetermined time period before and after the detection of the G value or the specific operation to the external server (202, 204) via the communication line (206), and that the feature point information is set in such a way that a front view (250) of the vehicle (1) is included in addition to the plural feature points in a visual field of the camera (212) of the portable information terminal (100) providing the drive recorder service.

According to the embodiment, the predetermined installation position of the portable information terminal is limited in such a way that the camera installed on the portable information terminal includes a front view of the vehicle, the portable information terminal can be used as a drive recorder with a simple configuration.

[11] Moreover, the portable information terminal (100) may have a communication function and the program (222) may be downloaded to the portable information terminal (100) from the server (204) or a website (202) via the communication line (206).

According to the embodiment, the method of the embodiment can be utilized easily.

[12] Furthermore, the portable information terminal (100) may have a communication function and the application (224, 226) may be downloaded to the portable information terminal (100) from the server (204) or a website (202) via the communication line (206).

According to the embodiment, the method of the embodiment can be utilized easily.

According to the embodiment, the installation of the portable information terminal on the vehicle can be carried out in a supporting form that is preferred by the user, and the installation position can be limited to a predetermined installation position. More specifically, if the portable information terminal is not installed at the predetermined installation position on the vehicle, a notification to that effect is provided. Therefore, the user can be made to limit the installation position of the portable information terminal on the vehicle to the predetermined installation position.

Obviously, numerous modifications and variations of the present invention are possible in light of the above teachings. It is therefore to be understood that within the scope of the appended claims, the invention may be practiced otherwise than as specifically described herein.

What is claimed is:

1. A method for determining an installation position of a portable information terminal on a vehicle, the method comprising:
   acquiring a present camera image showing a camera image at a present position of a camera of the portable information terminal installed on the vehicle;
   determining, based on a position of a predetermined vehicle component of the vehicle in the present camera image, whether or not the portable information terminal is installed at a predetermined installation position on the vehicle; and
   notifying from the portable information terminal that the portable information terminal is not installed at the predetermined installation position if it is determined that the portable information terminal is not installed at the predetermined installation position, wherein
   the portable information terminal has a communication function,
   the method is executed as a controller of the portable information terminal reads a program, and
   the program is downloaded to the portable information terminal from a server of a website via a communication line.

2. The method for determining the installation position of the portable information terminal on the vehicle according to claim 1, further comprising:
   recording an application providing a user of the vehicle with a predetermined service in the portable information terminal; and
   limiting at least a part of the predetermined service provided by the application recorded in the portable information terminal if it is determined that the portable information terminal is not installed at the predetermined installation position.

3. The method for determining the installation position of the portable information terminal on the vehicle according to claim 2, wherein
   the predetermined service provided by the application comprises a route guide service.

4. The method for determining the installation position of the portable information terminal on the vehicle according to claim 2, wherein
   the application is downloaded to the portable information terminal from the server or the website via the communication line.

5. The method for determining the installation position of the portable information terminal on the vehicle according to claim 2, further comprising:
   when it is determined that the portable information terminal is not installed at the predetermined installation position, providing a guidance, using at least an image on a display unit, so that the present position of the portable information terminal coincides with the predetermined installation position,
   wherein the guidance includes displaying, in the camera image, on the display unit the predetermined installation position of the portable information terminal and the present position of the portable information terminal so that the user can move the present position of the portable information terminal to coincide with the predetermined installation position of the portable information terminal.

6. The method for determining the installation position of the portable information terminal on the vehicle according to claim 2, further comprising:
   when it is determined that the portable information terminal is not installed at the predetermined installation position, providing a guidance, using at least an image on a display unit, so that the present position of the portable information terminal coincides with the predetermined installation position,
   wherein the guidance includes displaying on the display unit arrows that indicate directions in which the user is guided to move the portable information terminal to coincide with the predetermined installation position of the portable information terminal.

7. The method for determining the installation position of the portable information terminal on the vehicle according to claim 1, wherein
   the determining of the predetermined installation position further includes
      extracting plural feature points set on the predetermined vehicle component from the present camera image acquired by the camera of the portable information terminal, calculating present position coordinates expressing three-dimensional coordinates of a present position of the portable information terminal from two-dimensional coordinates of each of the feature points that are extracted in the extracting of the plural feature points, and determining whether or not the present position coordinates of the portable information terminal that are calculated in the calculating of the present position coordinates coincide with reference position coordinates expressing three-dimensional coordinates of the predetermined installation position.

8. The method for determining the installation position of the portable information terminal on the vehicle according to claim 7, wherein the notifying of the portable information terminal includes providing a guidance, if the present position coordinates of the portable information terminal do not coincide with the reference position coordinates, using one of an image and sound so that the present position of the portable information terminal coincides with the predetermined installation position.

9. The method for determining the installation position of the portable information terminal on the vehicle according to claim 7, wherein in the calculating of the present position coordinates, the predetermined vehicle component on which the plural feature points are set is one or plural, and a number of the feature points is set to a number that is necessary to calculate preset position coordinates of the portable information terminal plus redundancy, and the notifying of the portable information terminal includes notifying from the portable information terminal that the present position coordinates of the calculated portable information terminal coincide with the reference position coordinates and that no feature point is detected in the present camera image, if it is determined that the present position coordinates of the calculated portable information terminal coincide with the reference position coordinates but no feature point is detected in the present camera image.

10. The method for determining the installation position of the portable information terminal on the vehicle according to claim 7, further comprising:

downloading feature point information corresponding to a machine ID of the portable information terminal and a vehicle ID of the vehicle from an external server via the communication line, the feature point information indicating the plural feature points to be picked up by the camera of the portable information terminal installed at the predetermined installation position, the external server being configured to record the feature point information using a combination of a machine ID of the portable information terminal and a vehicle ID of the vehicle as a parameter.

11. The method for determining the installation position of the portable information terminal on the vehicle according to claim 10, further comprising:

acquiring, if a controller of the portable information terminal is wired or wirelessly connected to a vehicle controller of the vehicle, the vehicle ID from the vehicle controller; and downloading from the external server the feature point information corresponding to the vehicle ID acquired from the vehicle controller and the machine ID before the acquiring of the present camera image.

12. The method for determining the installation position of the portable information terminal on the vehicle according to claim 10, wherein the predetermined service provided by the application comprises a drive recorder service, if a G value exceeding a threshold value is detected by a G sensor provided in the portable information terminal or if a specific operation on the portable information terminal is detected, the drive recorder service transmits, to the external server via the communication line, an image acquired by the camera during a predetermined time period before and after the G value is detected or the specific operation is detected, and the feature point information is set in such a way that a front view of the vehicle is included in addition to the plural feature points in a visual field of the camera of the portable information terminal providing the drive recorder service.

13. The method for determining the installation position of the portable information terminal on the vehicle according to claim 7, further comprising:

controlling a light emitting device to emit light as the predetermined vehicle component via a vehicle controller of the vehicle in accordance with a light emission command from a controller of the portable information terminal.

14. The method for determining the installation position of the portable information terminal on the vehicle according to claim 1, wherein the portable information terminal comprises one of a mobile phone, a smartphone, and a tablet terminal.

15. The method for determining the installation position of the portable information terminal on the vehicle according to claim 1, further comprising:

when it is determined that the portable information terminal is not installed at the predetermined installation position, providing a guidance, using at least an image on a display unit, so that the present position of the portable information terminal coincides with the predetermined installation position, wherein the guidance includes displaying, in the camera image, on the display unit the predetermined installation position of the portable information terminal and the present position of the portable information terminal so that a user can move the present position of the portable information terminal to coincide with the predetermined installation position of the portable information terminal.

16. The method for determining the installation position of the portable information terminal on the vehicle according to claim 1, further comprising:

when it is determined that the portable information terminal is not installed at the predetermined installation position, providing a guidance, using at least an image on a display unit, so that the present position of the portable information terminal coincides with the predetermined installation position, wherein the guidance includes displaying on the display unit arrows that indicate directions in which a user is guided to move the portable information terminal to coincide with the predetermined installation position of the portable information terminal.

17. A method for determining an installation position of a portable information terminal on a vehicle, the method comprising:

acquiring a present camera image showing a camera image at a present position of a camera of the portable information terminal installed on the vehicle;

determining, based on a position of a predetermined vehicle component of the vehicle in the present camera image, whether or not the portable information terminal is installed at a predetermined installation position on the vehicle; and notifying from the portable information terminal that the portable information terminal is not installed at the predetermined installation position if it is determined that the portable information terminal is not installed at the predetermined installation position, wherein the determining of the predetermined installation position further includes extracting plural feature points set on the predetermined vehicle component from the present camera image acquired by the camera of the portable information terminal, calculating present position coordinates expressing three-dimensional coordinates of a present position of the portable information terminal from two-dimensional coordinates of each of the feature points that are extracted in the extracting of the plural feature points, and determining whether or not the present position coordinates of the portable information terminal that are calculated in the calculating of the present position coordinates coincide with reference position coordinates expressing three-dimensional coordinates of the predetermined installation position.

18. The method for determining the installation position of the portable information terminal on the vehicle according to claim 17, wherein the notifying of the portable information terminal includes providing a guidance, if the present position coordinates of the portable information terminal do not coincide with the reference position coordinates, using one of an image and sound so that the present position of the portable information terminal coincides with the predetermined installation position.

19. The method for determining the installation position of the portable information terminal on the vehicle according to claim 17, wherein in the calculating of the present position coordinates, the predetermined vehicle component on which the plural feature points are set is one or plural, and a number of the feature points is set to a number that is necessary to calculate preset position coordinates of the portable information terminal plus redundancy, and the notifying of the portable information terminal includes notifying from the portable information terminal that the present position coordinates of the calculated portable information terminal coincide with the reference position coordinates and that no feature point is detected in the present camera image, if it is determined that the present position coordinates of the calculated portable information terminal coincide with the reference position coordinates but no feature point is detected in the present camera image.

20. The method for determining the installation position of the portable information terminal on the vehicle according to claim 17, further comprising:

downloading feature point information corresponding to a machine ID of the portable information terminal and a vehicle ID of the vehicle from an external server via a communication line, the feature point information indicating the plural feature points to be picked up by the camera of the portable information terminal installed at the predetermined installation position, the external server being configured to record the feature point information using a combination of a machine ID of the portable information terminal and a vehicle ID of the vehicle as a parameter.

* * * * *